(No Model.)
F. J. OSMOND.
HUB AND BOTTOM BRACKET FOR BICYCLES.
No. 579,893. Patented Mar. 30, 1897.
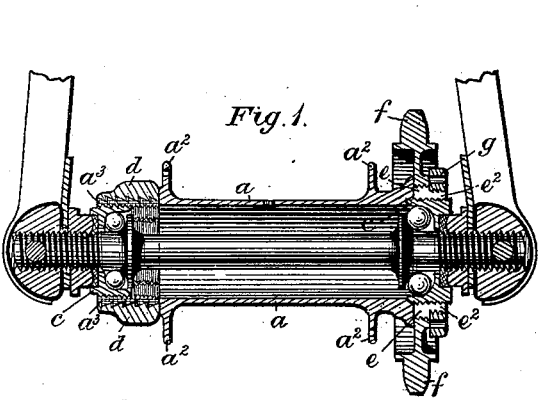
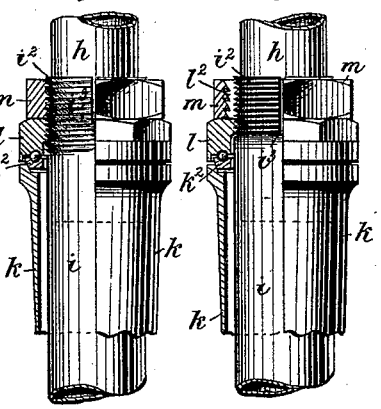
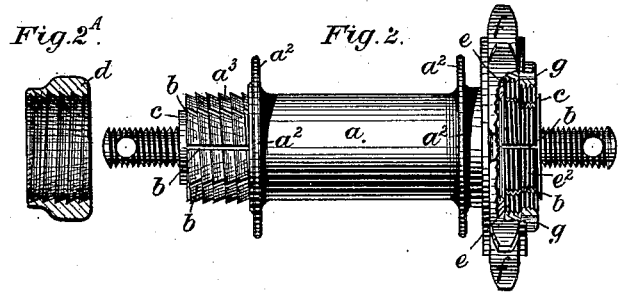
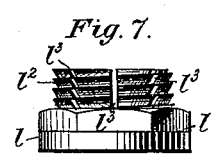
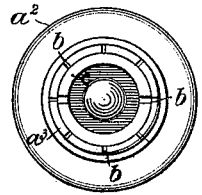
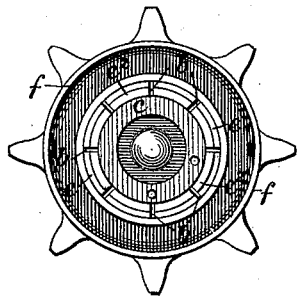
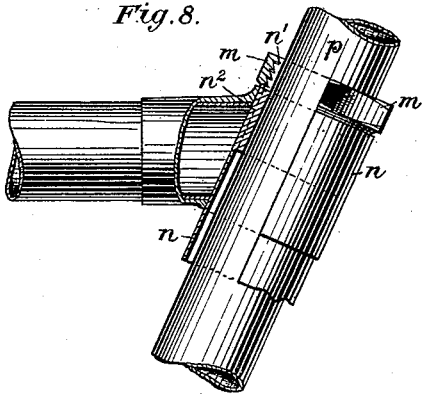
Witnesses:—
Richard Skerrett
Arthur John Powell
Inventor:—
Frederick John Osmond

United States Patent Office.

FREDERICK JOHN OSMOND, OF MOSELEY, ENGLAND.

HUB AND BOTTOM BRACKET FOR BICYCLES.

SPECIFICATION forming part of Letters Patent No. 579,893, dated March 30, 1897.

Application filed December 1, 1896. Serial No. 614,090. (No model.) Patented in England March 11, 1895, No. 5,116.

*To all whom it may concern:*

Be it known that I, FREDERICK JOHN OSMOND, a subject of the Queen of Great Britain, residing at Moseley, England, have invented certain new and useful Improvements in the Hubs and Bottom Brackets and other Parts of Bicycles, Tricycles, and other Velocipedes, (for which I have obtained Letters Patent of Great Britain, No. 5,116, dated March 11, 1895;) and I do hereby declare that the following is a full, clear, and exact description of the invention, which will enable others skilled in the art to which it appertains to make and use the same.

My invention consists principally of the construction and arrangement of parts hereinafter described for locking the cups of the ball-bearing arrangement of hubs and bottom brackets of bicycles, tricycles, and other velocipedes in the ends of the hub-shell or bottom-bracket barrel, the said construction and arrangement of parts being also applicable to the locking together of other parts of velocipedes, as hereinafter described.

I will describe my invention in connection with the ball-bearing cups of a hub.

According to my invention I make each of the internally-screwed mouths or ends of the hub-shell, into which the ball-cups are screwed, elastic, so that the said screwed mouths or ends of the hub-shell can be closed or contracted upon the screwed ball-cups and thereby effectually lock them in position. I make the said ends of the hub-shell elastic by slitting the said ends longitudinally by four or other number of equidistant radial slits or divisions, the said slits or divisions extending inward from the extreme end of the hub to a short distance behind the part into which the front end of the cup is screwed into the said hub. The exterior of the end of the hub is screwed with a large screw-thread, one side only of which is inclined, the other side being perpendicular, or nearly so, to the axis of the hub. I do not, however, limit myself to this shape of the thread. The exterior of the mouth of the hub has a shoulder against which a washer may be placed, and against the said washer a locking-ring screwed upon the external screwed elastic part of the hub is made to bear—that is to say, after the ball-cup has been screwed into its place in the internally-screwed and slit end of the hub, so as to retain the balls or spheres of the ball-bearing in their places against the race or cone on the axle, the washer is placed on the exterior of the hub and against the shoulder on the hub. The locking-ring is next screwed on the exterior of the elastic end of the hub and made to bear against the washer described. By the screwing home of the locking-ring the elastic or slit end of the hub is closed or compressed upon the screwed ball-cup and the latter locked very securely in the end of the hub-shell.

When the hub is provided with a chain-ring, that end of the hub which receives the said chain-ring has, besides the shoulder described, a right and left handed screw-thread, the right-handed thread receiving the chain-ring and the left-handed thread the locking-ring. By the screwing home of the locking-ring the chain-ring is fixed in its place and the elastic or slit end of the hub is at the same time closed or contracted upon the ball-cup for locking the latter in its place.

The locking of the ball-cups in bottom or crank-brackets of velocipedes is effected in the manner hereinbefore described with respect to the ball-cups of hubs.

Figure 1 of the accompanying drawings represents in vertical section the hub of the rear or driving wheel together with the rear part of the frame of a safety-bicycle containing my improvements. Fig. 2 represents, partly in elevation and partly in vertical section, the said hub detached from the bicycle-frame, one of the cone-locking rings being separated therefrom. Fig. $2^A$ represents in section the said separated locking-ring. Fig. 3 represents in elevation the left-hand end of the hub, Fig. 2; and Fig. 4 represents in elevation the right-hand or chain-wheel end of the said hub. Figs. 5 to 8, inclusive, illustrate the application of my invention to other parts of velocipedes, as hereinafter particularly described.

The same letters of reference indicate the same parts in the several figures of the drawings.

I will first describe the hub, Figs 1, 2, 3, and 4.

$a$ is the hub, and $a^2$ $a^2$ the spoke-flanges of the same. The mouths or open ends of the said hub, into which the bearing-cups $c\ c$ of the ball-races are screwed, are marked, respectively, $a^3$ and $e\ e^2$. The said mouths or ends of the hub are made elastic by longitudinal slits or divisions $b$, made in the said ends parallel to the axis of the hub. The elastic ends of the hub are screwed externally for receiving internally-screwed locking-rings. The locking-rings are marked, respectively, $d$ and $g$. The external screw-threads on the elastic ends are preferably inclined on one side only, the other side of the said thread being perpendicular to the axis of the hub, as is represented at the elastic end $a^3$, Figs. 1 and 2. By screwing home the locking-ring $d$ on the elastic end $a^3$ the said ring bears against the collar or flange $a^2$ of the hub, and the further screwing of the said ring results in the virtual forcing back of the said ring, the wedge-like screw-threads of which rising up the wedge-like screw-threads of the elastic end $a^3$ slightly contracts the said elastic end, thereby binding and locking the cup $c$ of the ball-bearing race in place.

In applying my improvements to hubs which are without chain-wheels, as well as when applying them to bottom brackets, I make the elastic or slit mouths at both ends of the hub or bottom bracket similar to the end $a^3$, Figs. 1, 2, and 3, but in applying my improvements to hubs of the kind represented in Figs. 1, 2, 3, and 4, that is, to hubs having at one end a chain-wheel or chain-ring, I modify the hub at that end, as illustrated in the drawings. I make the chain-wheel end of the hub of two diameters externally, the larger part $e$ having, preferably, a right-handed V-shaped screw-thread formed thereon, the smaller part $e^2$ being provided with a left-handed V-shaped screw-thread. On the larger part $e$ the chain wheel or ring $f$ is screwed and on the smaller part $e^2$ the ring $g$ is screwed, the said ring $g$ locking the chain-wheel $f$ to the hub and simultaneously locking the cup in the elastic end $e\ e^2$ of the hub.

The method I have described and illustrated of locking the ball-cups of hubs is applicable to the locking of the ball-cups of bottom brackets, as before mentioned, as well as to the locking of handle-bars, seat-pillars, brake-rods, and the like in their clips.

Fig. 5 illustrates the application of my invention to the fixing of the steering-handle column $h$ in position in the fork-stem $i$. In this arrangement the screw on the upper end $i^2$ of the fork-stem is of the kind illustrated with respect to the elastic end $a^3$ of the hub $a$ in Figs. 1 and 2, and the internal screw of the cone $l$ of the ball-head $l\ k^2$ is of a corresponding shape. The screwed end $i^2$ of the fork-stem is slit with preferably four slits or divisions, one of which is marked $i^3$. $m$ is the locking-ring, taking onto the screw $i^2$ of the fork-stem, thereby contracting the slit top of the said stem and fixing the handle-bar column $h$ in position. The ring $m$ simultaneously locks the cone $l$ of the ball-head.

In Fig. 6 I have represented a modified arrangement of parts for locking the handle-bar column $h$ in the fork-stem $i$. $k$ is the steering-socket of the bicycle-frame, having in its top the cup $k^2$, in which the bearing-balls of the ball-head work, as usual. In the said socket $k$ the stem $i$ of the steering-wheel fork takes, the upper screwed end $i^2$ of which stem is slit with preferably four slits or divisions, one of which is marked $i^3$. On the screwed slit end $i^2$ of the fork-stem $i$ the cone $l$ (represented detached in Fig. 7) takes. The upper end $l^2$ of the cone $l$ is screwed externally and slit, the slits or divisions marked $l^3$ in Fig. 7 being preferably eight in number. The externally-screwed end of the cone $l$ is provided with a locking-ring $m$, which when screwed home against the unscrewed end of the said cone contracts the slit end $l^2$ and through it the screwed slit end $i^2$ of the fork-stem. The stalk or column of the handle-bar is thus fixed and the cone of the ball-head simultaneously locked in position.

Fig. 8 illustrates the application of my improvements to the locking of the seat-pillar in the seat tube or socket of the bicycle-frame. The seat-tube $n$ of the frame is provided with a brazed liner $n^2$, the end $n'$ of which liner projects from the said tube $n$. The projecting end $n'$ is screwed and slit, preferably eight divisions or slits being made. On the introduction and adjustment of the seat-pillar $p$ in the seat-tube $n$ the locking-ring $m$ is screwed home against the top of the seat-tube, thereby contracting the slit part of the liner and fixing the seat-pillar in position.

Having described my invention, what I claim is—

1. The combination with a tube having a longitudinally-split and externally-threaded end, the said threads being inclined on one side only, the opposite side being perpendicular to the axis of the tube, of a nut or ring correspondingly threaded internally and adapted to engage and contract the split end of the tube, substantially as described.

2. The combination with a hub having longitudinally-split and internally and externally threaded ends, of externally-threaded ball-bearing cups screwed in the ends of said hub and internally-threaded rings or nuts screwed over the ends of the hub and operating to contract said ends about said cups, substantially as described and for the purpose specified.

FREDERICK JOHN OSMOND. [L. S.]

Witnesses:
RICHARD SKERRETT,
ARTHUR JOHN POWELL.